(12) United States Patent
Kimoto et al.

(10) Patent No.: US 8,153,091 B2
(45) Date of Patent: Apr. 10, 2012

(54) XENON RETRIEVAL SYSTEM AND RETRIEVAL DEVICE

(75) Inventors: Masahiro Kimoto, Tsukuba (JP);
Terumasa Koura, Tsukuba (JP); Yukio Fukuda, Tsukuba (JP); Masaki Narazaki, Wako (JP); Taiji Hashimoto, Ichidawa (JP); Toru Sakai, Nagoya (JP);
Kazuo Yokogi, Tsukuba (JP)

(73) Assignee: L'Air Liquide Societe Anonyme Pour l'Etude Et l'Exploitation des Procedes Georges Claude, Paris (FR)

( * ) Notice: Subject to any disclaimer, the term of this patent is extended or adjusted under 35 U.S.C. 154(b) by 197 days.

(21) Appl. No.: 12/516,723

(22) PCT Filed: Nov. 30, 2007

(86) PCT No.: PCT/IB2007/054877
§ 371 (c)(1),
(2), (4) Date: May 28, 2009

(87) PCT Pub. No.: WO2008/065633
PCT Pub. Date: Jun. 5, 2008

(65) Prior Publication Data
US 2010/0074820 A1    Mar. 25, 2010

(30) Foreign Application Priority Data
Dec. 1, 2006  (JP) ................. 2006-325373

(51) Int. Cl.
*B01D 53/04*  (2006.01)
(52) U.S. Cl. .......... 423/262; 423/240 R; 423/245.2; 95/45; 95/48; 95/47; 95/51

(58) Field of Classification Search ............ 423/240, 423/262; 141/66; 95/45, 82; 203/74
See application file for complete search history.

(56) References Cited

U.S. PATENT DOCUMENTS

| | | | | |
|---|---|---|---|---|
| 5,730,779 A | * | 3/1998 | Chernyakov et al. | 95/45 |
| 5,779,863 A | * | 7/1998 | Ha et al. | 203/74 |
| 6,089,282 A | * | 7/2000 | Spiegelman et al. | 141/8 |

(Continued)

FOREIGN PATENT DOCUMENTS
CN      1429658      7/2003
(Continued)

OTHER PUBLICATIONS
International Search Report for PCT/IB2007/054877.
(Continued)

*Primary Examiner* — Melvin Mayes
*Assistant Examiner* — Colette Nguyen
(74) *Attorney, Agent, or Firm* — Patricia E. McQueeney

(57) ABSTRACT

To provide a simple highly-pure Xe retrieval method and device with high retrieval efficiency by functionally removing such elements as water, CO2 and FCs from waste gases from semiconductor production processes, such as the plasma etching, that contain low-concentration Xe. For samples containing xenon and fluorocarbon, this invention is characterized by having at least first adsorption means (A1) filled with synthetic zeolite with pore size of 4A or smaller and aluminum oxide, arranged serially, gas separation means (A2) composed of silicone or polyethylene hollow fiber gas separation membrane modules 4, second adsorption means (A3) filled with either activated carbon, synthetic zeolite with pore size of 5A or larger, molecular sieving carbon with pore size of 5A or larger, or a combination of these, and reaction means (A4) filled with calcium compounds as reactant.

8 Claims, 6 Drawing Sheets

U.S. PATENT DOCUMENTS

| | | | |
|---|---|---|---|
| 6,440,196 B1 * | 8/2002 | Chiappini et al. | 95/45 |
| 6,565,821 B1 * | 5/2003 | Fraysse | 423/240 R |
| 6,605,134 B2 | 8/2003 | Ishihara et al. | |
| 6,752,851 B2 | 6/2004 | Kawai et al. | |
| 2006/0130649 A1 * | 6/2006 | Jain et al. | 95/82 |

FOREIGN PATENT DOCUMENTS

| | | |
|---|---|---|
| DE | 196 41 643 | 4/1998 |
| DE | 197 19 834 | 11/1998 |
| JP | 2002 097007 | 4/2002 |
| JP | 2002 126435 | 5/2002 |
| JP | 2003 032419 | 3/2003 |
| JP | 2005 246137 | 9/2005 |

OTHER PUBLICATIONS

Bolotnikov, A. et al. "Purification techniques and purity and density measurements of high-pressure Xe." Nuclear Instruments & Methods in Physics Research, Section-A: Accelerators, Spectrometers, Detectors and Associated Equipment, Elsevier, Amsterdam, NL, vol. 383, No. 2, Dec. 11, 1996, pp. 619-623.

Patent Abstracts of Japan, publication No. 04149010, publication date May 22, 2002, application No. 02273321, application filed Oct. 15, 1990.

IPRP for related PCT/IB2007/054877 mailed Jun. 11, 2009.

Hungarian Search Report and Written Opinion for related SG 200903545-2, mailed May 13, 2010.

* cited by examiner

[Figure 1]
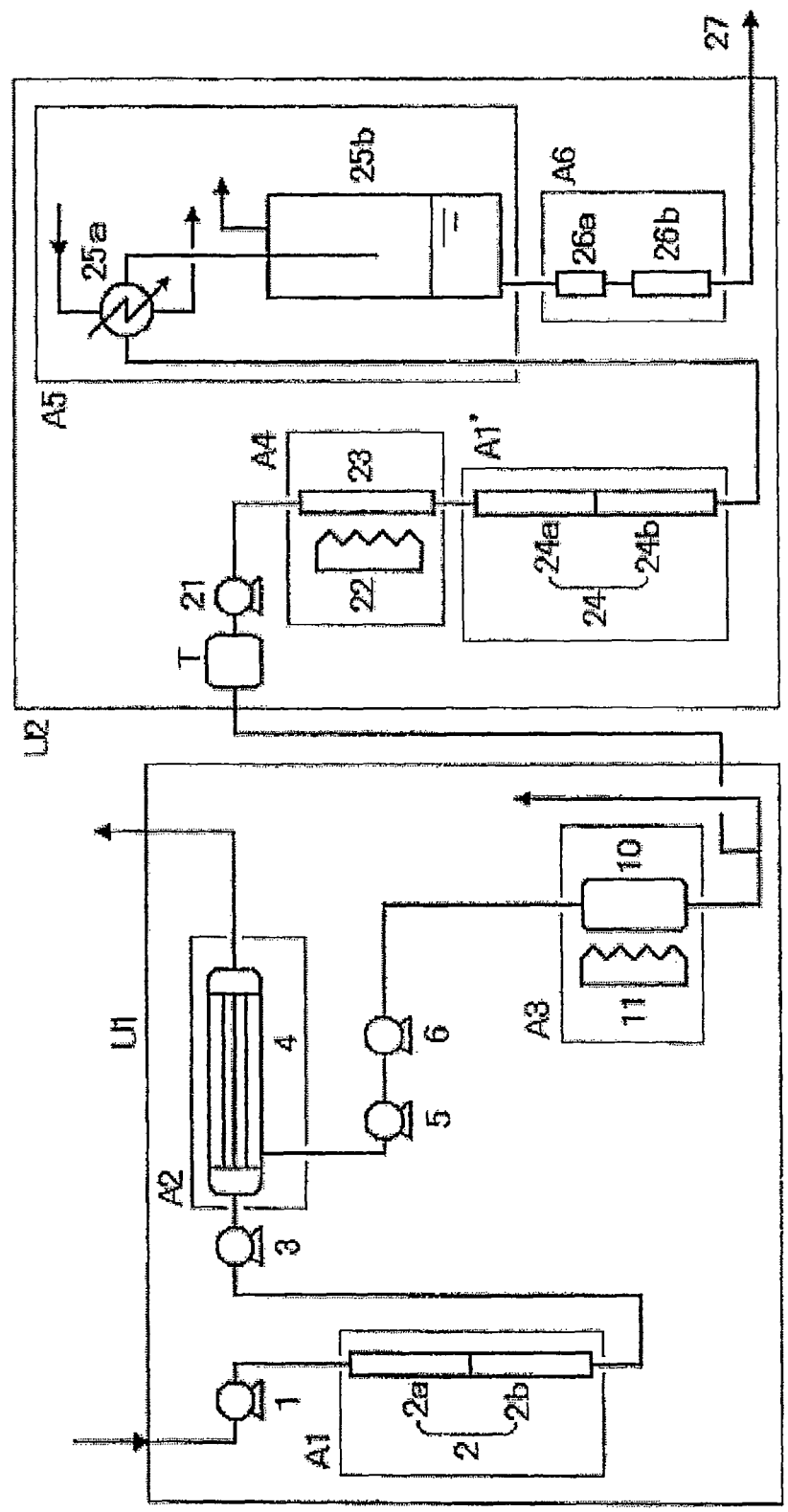

[Figure 2]
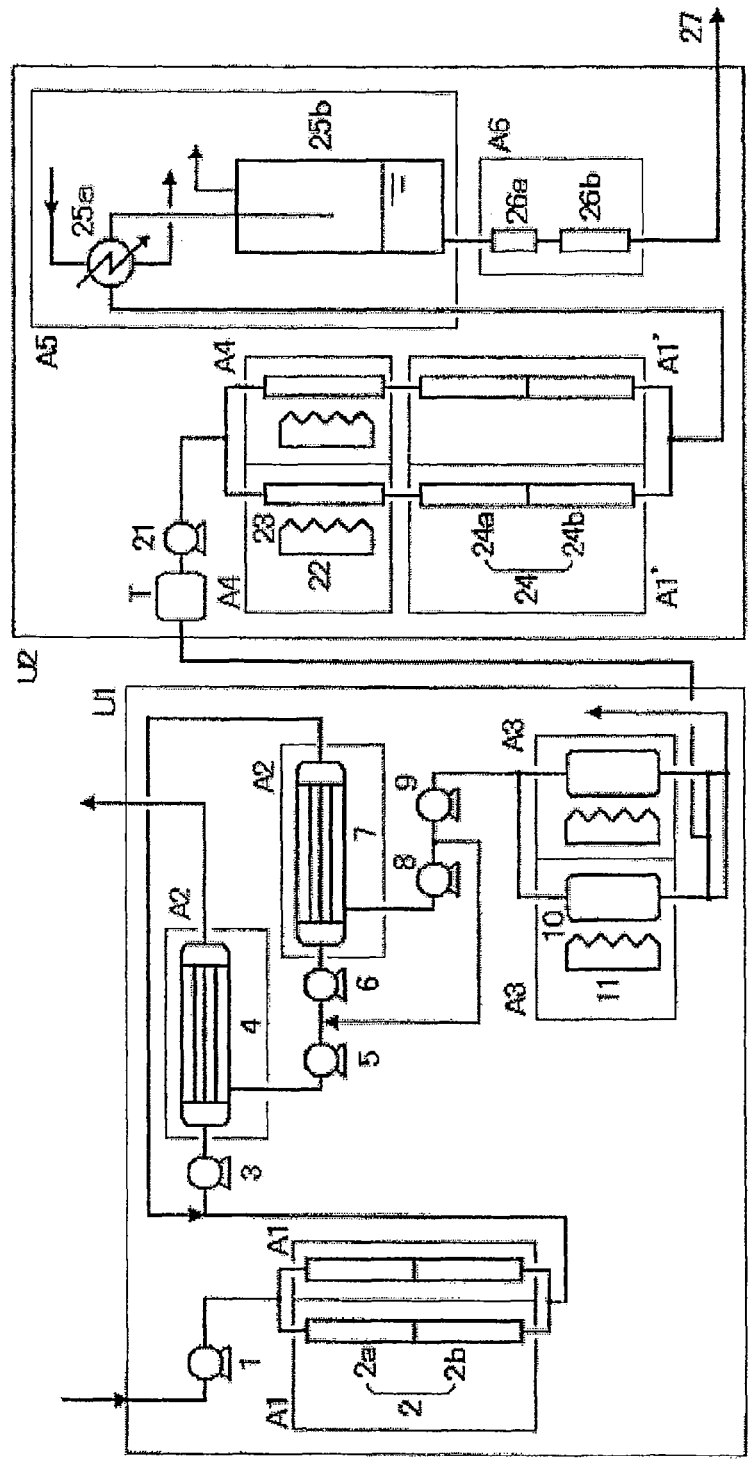

[Figure 3]
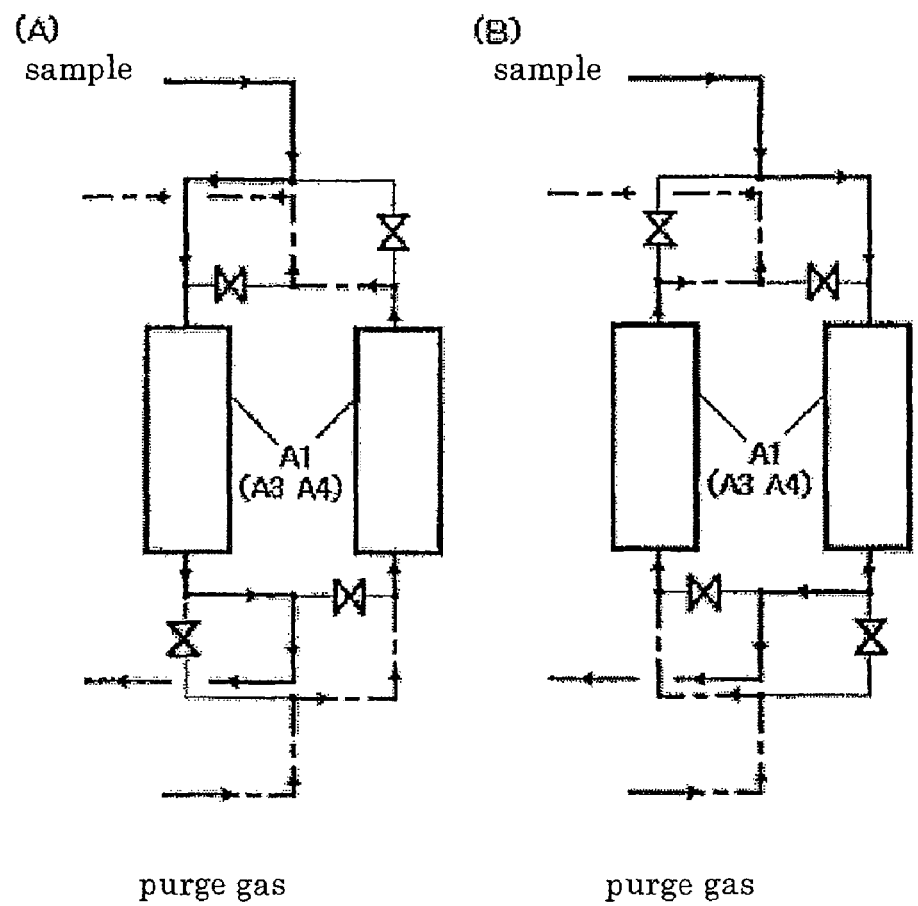

[Figure 4]
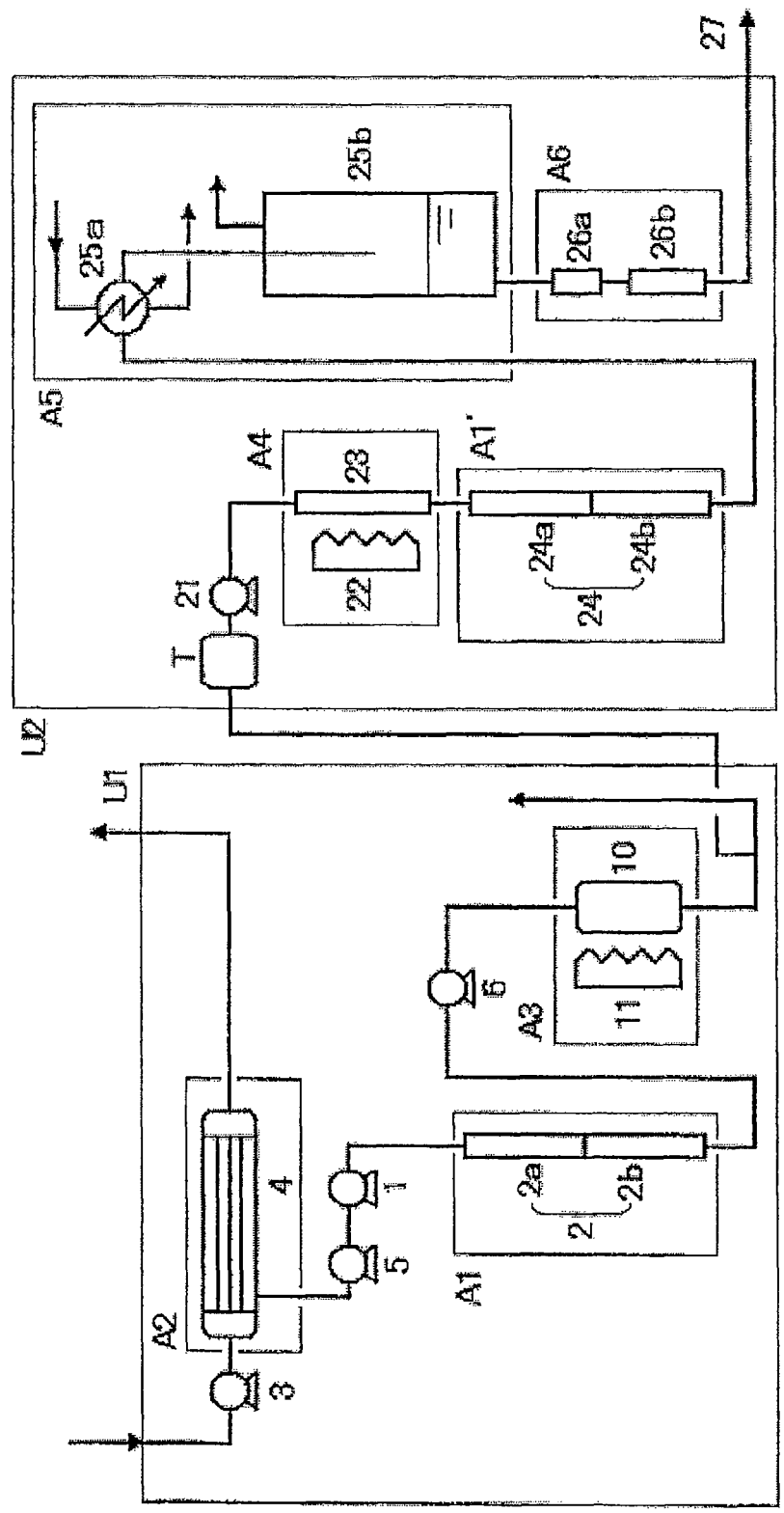

[Figure 5]
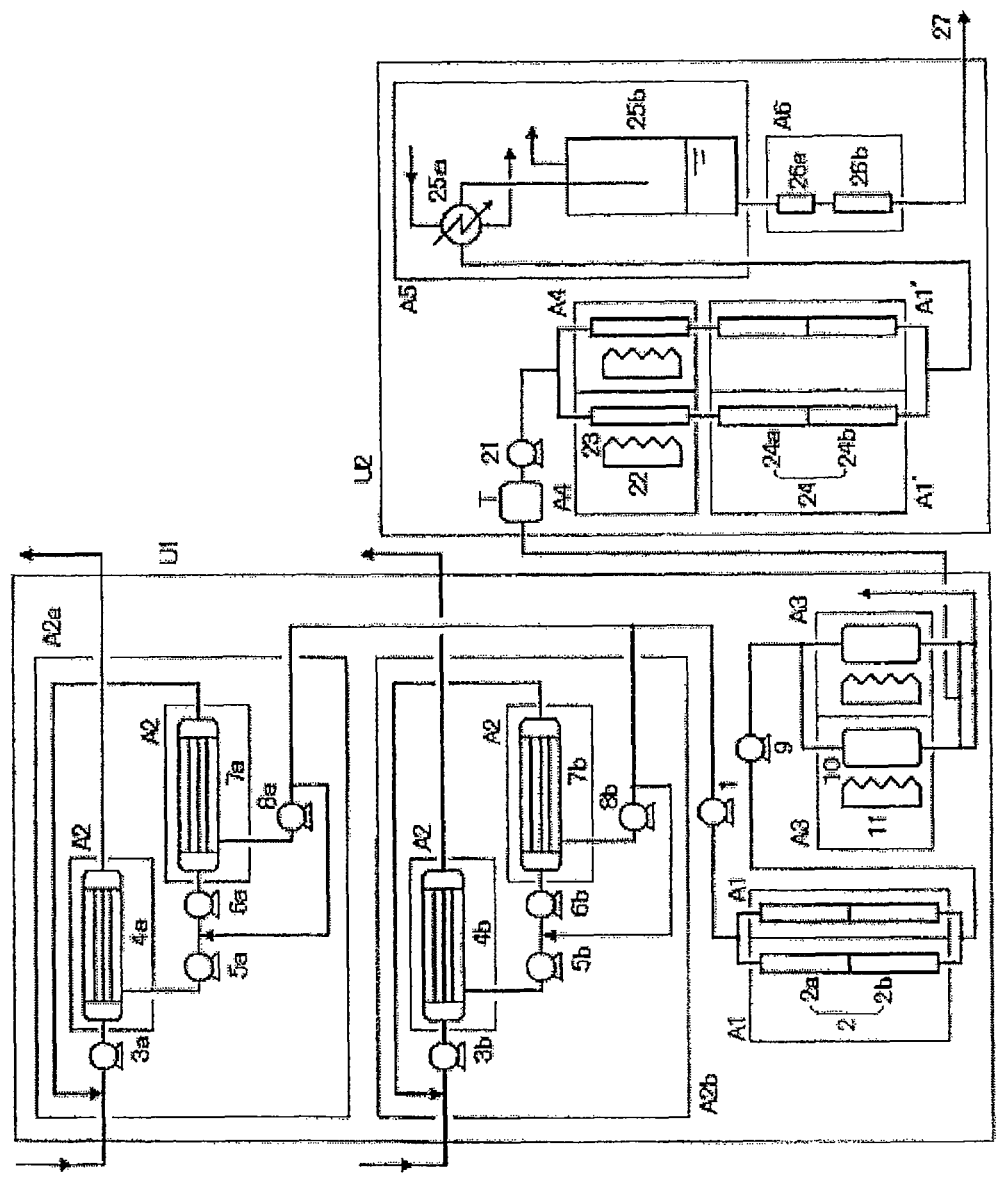

[Figure 6]
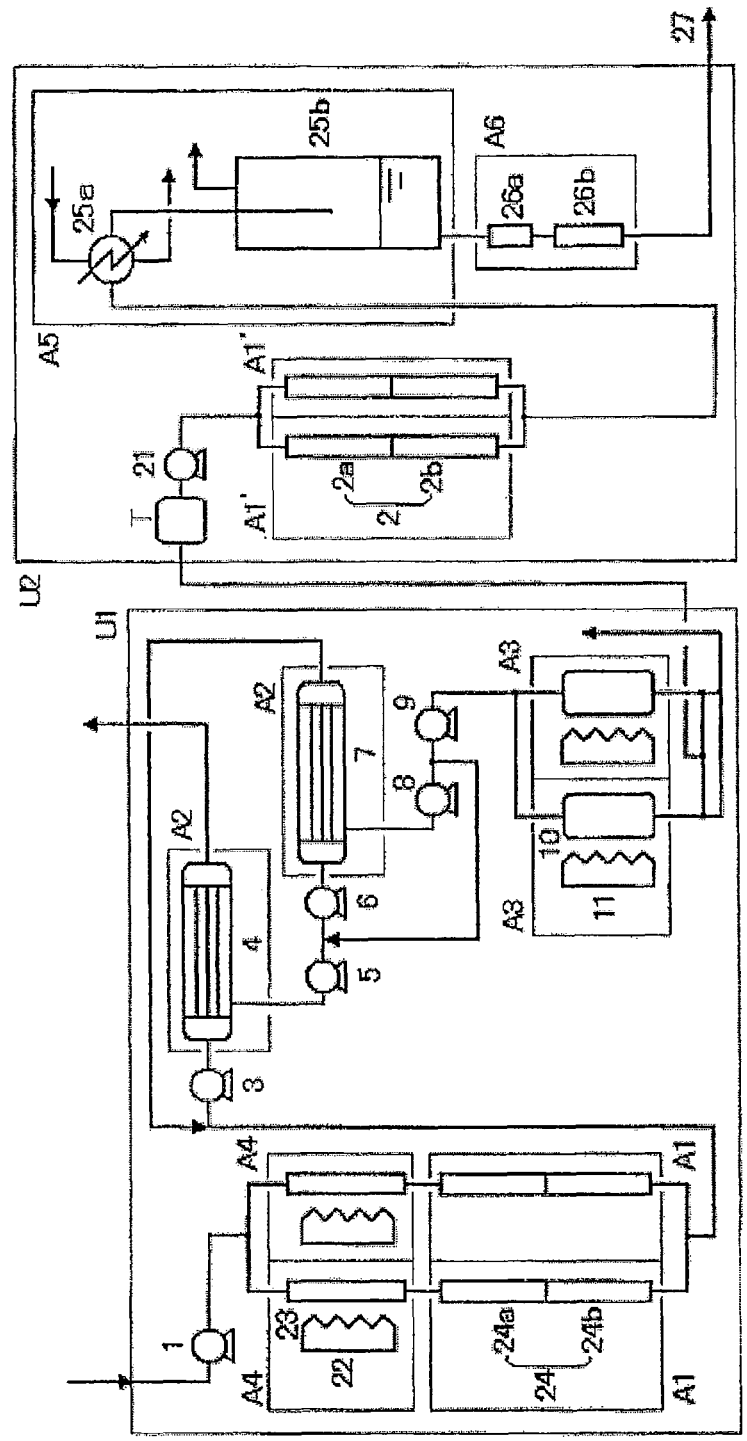

XENON RETRIEVAL SYSTEM AND RETRIEVAL DEVICE

This application is a 371 of International PCT Application PCT/IB2007/054877, filed Nov. 30, 2007, the entire contents of which are incorporated herein by reference.

TECHNOLOGICAL FIELD

This invention pertains to a xenon (hereinafter referred to as "Xe") retrieval system and retrieval device, and is useful especially in retrieval systems and retrieval devices for xenon used as an assist gas in production devices such as the plasma etching device that is used in semiconductor production factories. Here, "retrieval" means to selectively draw out specific components in a reusable form from a sample using such means as adsorption and membrane separation.

BACKGROUND TECHNOLOGY

Xe is used as assist gas in semiconductor production processes such as the plasma etching process. Xe is not consumed by reaction, etc. during the process, and is discharged as waste gas with water, carbon dioxide ($CO_2$) and such reaction products as fluorohydrocarbons (FC) such as $CHF_3$, $CF_4$, $C_2F_6$ and $C_2F_4$. Since Xe is extremely expensive and a rare element, retrieval and recycle of Xe in waste gases have been demanded.

For retrieving Xe, it is desirable to collect the waste gas from a section that does not affect the semiconductor process. Specifically, if the waste gas is collected from the downstream of the detoxification device (detoxifies carbon monoxide (CO), fluorine ($F_2$), hydrogen fluoride (HF), etc. by combustion, catalytic reaction or adsorption) of reactive gases located at the downstream of the semiconductor production process, it is possible to avoid affecting the semiconductor production process. However, since the waste gas collected from this section contained only approximately 0.1~1 vol. % (hereinafter referred to as "%") of Xe, and approximately the equivalent concentration of other substances such as water, $CO_2$, and FC as impurities, there was a technological problem to be overcome. In other words, to retrieve and concentrate Xe from a section that does not negatively affect the process, it is necessary not only to efficiently retrieve and concentrate low-concentration Xe but also to efficiently remove impurities such as water, $CO_2$ and FC.

Some technologies to retrieve and recycle noble gases such as Xe from such semiconductor production processes have previously been reported. Specifically, the following proposals can be listed.

(1) Methods of separating and refining high-added-value gases (noble gases) from waste gases by combining the pressure variable adsorption separation method (PSA) and velocity type pressure variable adsorption separation method (refer to patent document 1, for example).

(2) Noble gases retrieval devices that retrieve noble gases contained in waste gases discharged from facilities that use noble gases, retrieve the noble gases by at least 2 or more gas separation processes, and use the retrieved gases by returning them to the noble gas supply line of the facilities that use noble gases (refer to patent document 2, for example).

(3) Refinement methods characterized by separating halogenated hydrocarbon by low-temperature adsorption from waste gases discharged from facilities that use noble gases (refer to patent document 4, for example).

(4) Devices that separate, refine, recycle and reuse high-added-value gases (noble gases) by introducing methods, using PSA, to remove minor gas components such as helium (He) and hydrogen ($H_2$) that are normally difficult to separate from waste gases containing high-added-value gases (noble gases) such as krypton (Kr) and Xe (refer to patent document 4, for example).

[Patent document 1] Patent published unexamined application 2002-126435
[Patent document 2] Patent published unexamined application 2002-097007
[Patent document 3] Patent published unexamined application 2003-062419
[Patent document 4] Patent published unexamined application 2005-246137

DISCLOSURE OF INVENTION

Problems to be Resolved by Invention

The following problems, however, could occur with the above-mentioned retrieval methods and retrieval devices. As to proposals (1)~(5);

Method (1) requires that the concentration of noble gas in the waste gas to be approximately 30%, and is based on the premise that the other impurity in the waste gas is nitrogen only. Therefore, it can not efficiently refine highly-pure noble gas from waste gases with low noble gas concentration of approximately 0.1~1.0% and, at the same time, containing FC. It is also not applicable when FC exists as impurity.

With method (2), when the waste gas contains such impurities as water, $CO_2$ and FC, such gases can not be removed sufficiently at 2 or more gas separation processes and the adsorption separation device at their downstream and such impurities will remain in the noble gas. As, for example, it is stated, regarding the recycled noble gas, "As to the slight amount of impurities such as oxygen, nitrogen, water, CO, $CO_2$, fluorocarbon, hydrogen, and various film-formation gases that can not be removed and remain in the noble gas, ... the impurity concentration is 100 ppm or lower, and desirably 10 ppm or lower" (paragraph [0048] of patent document 2), this method can not supply highly-pure noble gas of 99.99% purity.

Since method (3) absolutely requires installment of a freezer for removing halogenated hydrocarbon, it is not necessarily advantageous in terms of energy when considering such performances as insulation. Therefore, it is difficult to apply it in this technological field where methods with less energy consumption are required. Moreover, as a drawback of adopting a low-temperature adsorption method that uses an adsorbent, the Xe retrieval efficiency is lowered since it adsorbs Xe as well as halogenated hydrocarbon, and discharges Xe, at the same time, during the regeneration process of the adsorbent.

With method (4), when the waste gas contains impurities that are easily adsorbed, such as water, $CO_2$ and FC, and since these unnecessary gases are also adsorbed with noble gas by the 1$^{st}$-stage adsorption cylinder, these unnecessary gases remain in the noble gas as impurities when the adsorbed gas is separated by the pressure swing. Therefore, this method can not supply highly-pure noble gas of 99.99% purity.

As described above, the methods that have been reported so far are only applicable to waste gases with high-concentration Xe (approximately 30~50%), and not meant for retrieval and recycle of Xe from waste gases with low-concentration Xe (0.1~1.%). Moreover, they are not applicable to waste gases that contain such impurities as water, $CO_2$ and FC.

At present, the combustion method and plasma decomposition method are generally used to remove FC. In the combustion method, an enormous volume of air is used as the assist gas for combustion and the Xe concentration in the waste gas at the outlet of the combustion device drops to approximately 1/100 of the Xe concentration at the inlet of the combustion device. In other words, the amount of waste gas is increased approximately 10-fold. In this case, a large-scale mechanism will be necessary to retrieve and concentrate Xe, and the efficiency of retrieving, concentrating, and refining will be lowered extremely. With the plasma method, complete removal of FC is difficult, and since the FC removal efficiency greatly varies depending on the FC concentration at the inlet, its applicability is difficult.

The objective of this invention is to provide to the user a simple and efficient retrieval method and retrieval device that can retrieve highly-pure Xe by functionally removing such elements as water, $CO_2$ and FC (hereinafter referred to as "impurities") from waste gases, containing low-concentration Xe, from such semiconductor production processes as the plasma etching process.

Here, "low-concentration Xe" means Xe of 1% concentration or lower, "high-concentration Xe" means Xe of 10% or higher concentration, and "highly-pure Xe" means Xe of 99.99% or higher concentration.

Means to Solve the Problems

The inventors of this invention reached completion of this invention after accumulation of dedicated research to resolve the aforementioned problems, and discovered that it is possible to realize the aforementioned objective using the following Xe retrieval system and retrieval device.

This invention is a system that retrieves xenon from samples that contain xenon and at least fluorocarbon, and characterized by processing operations including at least the following processing processes of said samples;

(A1) adsorption and removal of trifluoromethane that is a type of aforementioned fluorocarbon, using an adsorbent, (A2) removal of fluorocarbon having saturated bond that is a type of aforementioned fluorocarbon and concentration of xenon using gas separation membranes, (A3) adsorption and retrieval of aforementioned xenon using an adsorbent and separation of xenon from said adsorbent, (A4) Removal of fluorocarbon having unsaturated bond, that is a type of aforementioned fluorocarbon using a reactant.

As stated above, it is impossible with only a single-function separation means to retrieve highly-pure Xe from waste gases that contain low-concentration Xe and various other impurities, and that there is a limit even combinations of separation means having different functions are used. The inventors of this invention, as a result of verifying the separation properties of individual coexisting components regarding separation and refinement means including various other means in addition to the conventional separation means, and the distinct effect of the arrangement of these means, discovered that it is possible to remove the impurities, which had not been possible with the conventional methods, and obtain extremely pure Xe using the processing operation including the processing processes of (A1)~(A4) above.

Specifically, while such elements as water and $CO_2$ in the impurity are removed by conventional adsorbents, as to FCs, it has become possible to effectively and efficiently remove impurities by combining adsorption and removal of trifluoromethane ($CHF_3$) with adsorbent (A1), separation and removal of FCs having saturated bond (hereinafter referred to as "saturated FC"), such as tetrafluoromethane (CF4) and hexafluoroethane (C2F6), with gas separation membrane (A2), and reaction and removal of FCs having unsaturated bond (hereinafter referred to as "unsaturated FC"), such as tetrafluoroethylene ($C_2F_4$) and hexafluoropropene ($C_9F_8$), with reactant (A4). Moreover, through 2 stages of Xe concentration processes—gas separation membrane in process (A2) and adsorbent in process (A3)—it has become possible to obtain highly pure and functionally excellent Xe with little loss. This invention makes it possible to retrieve highly pure Xe, which had previously been impossible, and provide a simple retrieval system with a high retrieval ratio, with synergistic effect of such impurity removal function and concentration function.

As to the order of the processing processes (A1)~(A4), while there are restrictions depending on the sample condition, it is basically possible to arrange them at the discretion of the user. In general, in most cases it is desirable to arrange them in the order of (A1)→(A2)→(A4)→(A3) so that the concentration process of Xe is conducted after the impurities have been removed, but since there are cases, as in processing process (A2), in which the Xe concentration process can be conducted simultaneously, or as in processing process (A4), in which new additional impurities such as water and $CO_2$ are generated in the reaction process, it is desirable that the optimal order of the processes be set to suit the sample condition. Since in this system it is possible to arbitrarily combine multiple processing processes of different forms such as adsorption, reaction and membrane separation, and processing processes that individually and/or simultaneously conduct impurity removal and Xe concentration, it is characterized by the possibility of establishing an extremely versatile system with such broad-ranging applicability that had conventionally been unavailable. Furthermore, it is also easy to combine it with other processing means (such as low-temperature phase-change separation processing process) that are mentioned later to enable applicability to a broader range of sample conditions.

This invention is a xenon retrieval system stated above characterized by inclusion of the following processing processes in addition to the aforementioned processing processes (A1) to (A4);

(A5) processing operation including separation of xenon by a phase-change process under a temperature condition lower than the boiling point of xenon, or said processing process (A5) and the following processing process, (A6) separation and removal of residual impurities using a high-temperature getter.

With a retrieval system for Xe from samples containing low-concentration Xe of approximately 0.1—0.5%, it is difficult to concentrate Xe to a highly pure degree with a single-stage processing operation or multiple stages of similar types since the sample also contains impurities at approximately the same concentration. With this invention, it has become possible to efficiently and consistently retrieve extremely pure Xe of 99.99% for the first time by an efficient separation and concentration step using gas separation membranes in the first stage, adsorption using an adsorbent and selective concentration through separation from said adsorbent in the second stage, and low-temperature phase-change separation from the sample, after most of the impurities have been removed, in the third stage. A required condition is that the phase-change temperature at this time shall be normal boiling point of Xe, which is −108.1° C., or lower than its normal melting point of −111.9° C., at −110~−150° C. Here, "low temperature" refers to temperature of −110° C. or below.

As to further highly-pure Xe that is demanded in the latest semiconductor production process, it has become possible to efficiently and consistently retrieve extremely highly-pure Xe of 99.999% by applying a separation and removal operation of the residual impurities using a high-temperature getter in addition to the third stage concentration operation using low-temperature phase-change separation.

This invention is a xenon retrieval system stated above, characterized by conducting processing operation using synthetic zeolite with pore size of 4 Å or smaller as an adsorbent at the first-stage and aluminum oxide at the second-stage in aforementioned processing process (A1).

As stated above, the inventors of this invention have made it possible to retrieve desired highly pure Xe without loss from sample gases in which such elements as water, $CO_2$ and FCs coexist, which had conventionally been extremely difficult, by effectively using multiple processing means. Among the FCs, as to $CHF_3$ in particular, it was revealed in this verification that it can be extremely efficiently and selectively removed with an adsorption process using aluminum oxide. This fact has a significant implication in Xe retrieval systems. In this invention, by further adding synthetic zeolite with pore size of 4 Å or smaller at the first-stage to selectively remove water and $CO_2$, it became possible to further improve the CHF adsorption capacity by preventing competitive adsorption at the second-stage that uses aluminum oxide. Moreover, due to adsorption of $CHF_3$ by aluminum oxide, it has become possible to selectively concentrate $CHF_3$ through separation of $CHF_3$ from said adsorbent and, hence, individual retrieval of $CHF_3$ has become possible.

This invention is a xenon retrieval system stated above, characterized by conducting processing operation using silicone or polyethylene hollow fiber gas separation membrane modules as the gas separation membranes in aforementioned processing process (A2).

In a retrieval system for Xe from samples that contain FCs, while it is desirable to also separate saturated FCs, such as $CF_4$ and $C_2F_6$, under retrievable conditions, removal operation of saturated FCs using an adsorbent is not practical due to its low removal efficiency. Through the verification process of this system, the inventors of this invention discovered that it is possible to efficiently remove saturated FC by a separation process using silicone or polyethylene hollow fiber gas separation membrane modules. Moreover, since said gas separation membrane is also effective in concentrating Xe, and enables performance of both functions under a common condition in the same process, it became possible to form a highly-pure Xe retrieval system with said gas separation membrane as its major component.

This invention is a xenon retrieval system stated above, characterized by conducting processing operation using either activated carbon, synthetic zeolite with pore size of 5 Å or larger, molecular sieving carbon with pore size of 5 Å or larger, or a combination of these as an adsorbent in aforementioned processing process (A3).

In a Xe retrieval system, a high Xe retrieval efficiency is also an important requisition in addition to a high concentration rate from extremely low-concentration Xe. In response to such demands, this invention has made it possible to compose a highly selective Xe retrieval system with little loss by using either activated carbon, synthetic zeolite with pore size of 5 Å or larger, molecular sieving carbon with pore size of 5 Å or larger, or a combination of these as an adsorbent that has excellent adsorption and separation properties for relatively large molecules, in addition to the gas separation membrane of the first stage.

This invention is a xenon retrieval system stated above, characterized by conducting processing operation using calcium compounds as the reactant in aforementioned processing process (A4).

As to unsaturated FCs, such as C2F4 and C3F6, unlike saturated FCs, it is difficult to separate them under retrievable conditions such as adsorbents and gas separation membranes. The inventors of this invention, in the verification process of this retrieval system for Xe from samples that contain FCs, discovered that various compounds that contain calcium in particular among alkaline earth metals react selectively with unsaturated FCs under conditions in which they coexist with saturated FCs. Moreover, since alkaline calcium compounds are also useful for removing CO2 at the same time, and enable performance of both functions under a common condition in the same process, it became possible to form a highly-pure Xe retrieval system with calcium compounds as its major component.

This invention is a device that retrieves xenon from samples that contain xenon and at least fluorocarbon, and characterized by having at least the following processing processes of said samples;

(A1) first adsorption means filled with synthetic zeolite with pore size of 4 Å or smaller and aluminum oxide, arranged serially, (A2) gas separation means composed of silicone or polyethylene hollow fiber gas separation membrane modules, (A3) second adsorption means filled with either activated carbon, synthetic zeolite with pore size of 5 Å or larger, molecular sieving carbon with pore size of 5 Å or larger, or a combination of these, (A4) and reaction means filled with calcium compounds as reactant.

To efficiently retrieve and highly concentrate Xe from samples that contain impurities such as FCs as well as low-concentration Xe, it is vital to have not only processing means with removal function of individual impurity and processing means with Xe concentration function, but also to raise the level of capacity and functions of each processing means, and combine processing means with both functions to obtain synergistic effect. In the Xe retrieval device pertaining to this invention, one of the characteristic is combination of multiple types of processing means that are adsorption means, reaction means and membrane separation means, to make effective use of the unique functions of each type of processing means, and another characteristic is to make use of the processing means so that the same type of processing means have different functions. For example, as to the adsorption means, by making the first adsorption means to function as an adsorption process for impurities only, and the second adsorption means to function as an adsorption process for Xe only, distinction between the impurity removal function and Xe concentration function is made. As to the Xe concentration function, the gas separation membranes of the first concentration means function to concentrate Xe and at the same time as a separation means for saturated FCs that are difficult to remove using an adsorbent among the impurities, and the second concentration means function as Xe adsorption means. By making such functional use of the processing means, it is possible to provide a simple retrieval device with high retrieval efficiency that enables retrieval of highly pure Xe.

This invention is a xenon retrieval device characterized by having the following processing means in addition to aforementioned processing means (A1)~(A4);

(A5) low-temperature separation means having an open space maintained at temperature lower than the boiling point of xenon, or said processing means (A5) and the following processing means;

(A6) removal means consisting a high-temperature getter.

As stated above, it has become possible to retrieve Xe of extremely high purity of over 99% by using the processing means (A1)~(A4) to remove most of the impurities in samples that contain Xe of low-concentration of approximately 0.1~0.5%. This invention further enables efficient and stable retrieval of Xe of extremely high purity of over 99.99% by introducing the samples to a low-temperature separation means having a low-temperature open-space to apply a processing operation that accompanies phase-change. Moreover, it has made it possible to consistently retrieve Xe of extremely high purity of over 99.999% by adding a removal means comprising a high-temperature getter to apply a separation and removal operation for residual impurities at the latter stage of such low-temperature separation means.

Effect of this Invention

As stated above, it is possible with this invention to provide a simple retrieval method and retrieval device with high retrieval efficiency that enable functional removal of impurities from samples that contain low-concentration Xe, and retrieve highly pure Xe. It is also possible to add such means as the low-temperature phase-change separation means and getter, and it is possible to obtain further highly pure Xe by using these added functions.

[Optimal Configuration for Implementing this Invention]

The configuration of implementing this invention is explained below.

This invention is a system that retrieves Xe from samples that contain Xe and FC, and includes at least the following processing processes;

(A1) adsorption and removal of $CHF_3$ using an adsorbent, (A2) separation and removal of saturated FCs (such as $CF_4$ and $C_2F_6$) and concentration of Xe using gas separation membranes, (A3) adsorption and retrieval of Xe using an adsorbent and concentration of Xe by separating it from said adsorbent, (A4) reaction and removal of unsaturated FCs (such as $C_2F_4$ and $C_3F_6$) using a reactant.

Specifically, it is a system that uses a simple and efficient method to remove water, $CO_2$ and such FCs as $CHF_3$, $CF_4$, $C_2F_6$, and $C_2F_4$ from such samples as the waste gas from semiconductor production processes, such as the plasma etching process, containing low-concentration Xe of approximately 0.1~1% and such elements as FCs, and retrieve, concentrate and refine Xe. However, in such processes as the semiconductor production process, the Xe concentration and the components and concentration of impurities vary greatly depending on whether the gas immediately after the process is processed as the sample, or the gas before or after the waste gas treatment process (detoxification process) is processed as the sample, but if the concentration is high, it is possible to process it with the functions of this system by a dilution process that uses an inert gas (preferably a type of gas that can be removed by this system) before introducing it to this system. The processing means and processing contents are detailed for each process below.

(A1) Adsorption and Removal Processing Process of $CHF_3$ Using an Adsorbent

This is a processing process for $CHF_3$ that is a type of FC coexisting in samples, and it is desirable that aluminum oxide is used as the adsorbent. Although synthetic zeolite and activated carbon have conventionally been used as the processing adsorbent for $CHF_3$, they were insufficient in the adsorption capacity for especially low-concentration CHF3 in the verification process by the inventors of this invention. As to zeolite, for example, it was not possible to achieve sufficient adsorption and removal using zeolite of any pore size. As to activated carbon, it was revealed that it is not suited for the purpose of selectively removing $CHF_3$ since its adsorption capacity of Xe and other components is also high. As a result of verification, as stated later, it is possible to obtain removal efficiency of over 99% by using aluminum oxide.

The form of aluminum oxide to be used here, such as powder or granules, is not stipulated but considering the pressure loss of the processing gas and processing load at downstream, granules are desirable. It is also desirable to use activated aluminum or sintered compacts that have large surface areas.

Moreover, in this system, it is desirable to compose a processing unit with synthetic zeolite with pore size of 4 Å or smaller at the first-stage and aluminum oxide at the second-stage. While aluminum oxide itself has high capacity of adsorbing water and $CO_2$, the original purpose of this system of selectively removing $CHF_3$ is lowered. Therefore, it is possible to secure a high $CHF_3$ removal function by adsorbing and removing these components that are more likely to coexist in the sample at the first-stage.

(A2) Separation and Removal Processing Process of Saturated FCs and Concentration Processing Process of Xe Using Gas Separation Membranes It shall correspond to the processing process that assumes separation and removal of saturated FCs, such as $CF_4$ and $C_2F_6$, that are a type of FCs coexisting in the sample, and at the same time the first-stage concentration processing process of Xe, and it is desirable to use gas separation membranes that have highly-permeating property for Xe and poorly-permeating property for saturated FCs. The material and structure of the gas separation membrane is not stipulated as long as it has the aforementioned functions, but as to the material of the membrane, it was found that non-porous membrane made of polyethylene or silicone rubber is most optimal in the verification process by the inventors of this invention as stated later. The former is generally suitable for use at ambient temperature and optimally at temperatures of 40° C. or lower, and the latter, with a normal heat-resistant temperature of 200° C., is suitable for relatively high temperatures (above ambient temperature, or approximately 50~100° C.). It was revealed that such porous membranes as ceramics membrane and zeolite membrane, as inorganic membranes, are also usable.

As to the structure of the membrane module, for non-porous membranes it is possible to use, for example, a spiral type membrane module, pleats type module or hollow fiber membrane module, and the inventors of this invention found through the verification process that the hollow fiber membrane module is desirable in terms of processing capacity.

Since the membrane area of the gas separation membrane affects the processing capacity, it is necessary to have a certain required membrane area or greater, but a membrane area larger than what is necessary for the processing amount will cause to lower the membrane processing efficiency or separation capacity (lowers permeability of gases that permeates easily and increases amount of permeation of gases that do not permeate easily). It is therefore desirable to use it under an optimal condition. Specifically, in this system, an area of approximately 20~100 m² is preferable when the processing sample flow rate is set at 20~30 slm.

By using the membrane module as described above, it is possible to obtain removal efficiency of over 90% for saturated FCs of 100~1000 ppm, and at the same time make the concentration of the Xe to 5=10% that was 0.2~0.5% at the time Xe was unprocessed in the sample. Moreover, as stated later, it is also possible to suit the sample characteristics and specifications by not only using a single membrane module but also combining multiple membrane modules in a parallel or serial arrangement, or combination of the two.

(A3) Adsorption and Retrieval of Xe Using an adsorbent and Concentration Processing Process of Xe by Separating Xe from Adsorbent This corresponds to the concentration processing process of Xe in the sample in the second stage. Since the molecular diameter is larger than other molecules in which Xe coexists, it is possible to conduct a highly selective separation process by performing an adsorption process using either activated carbon, synthetic zeolite with pore size of 5 Å or larger, molecular sieving carbon (MSC) with pore size of 5 Å or larger, or a combination of these as the adsorbent. This process is divided into the adsorption processing process and separation processing process, and it is possible to retrieve gas that contain highly concentrated Xe by conducting the adsorption process for a designated duration of time in the former, and then separating it by heating the adsorbent in the latter. At this time, by further purging the adsorbent with a small amount of inert gas, efficient separation process can be performed. Specifically, from unprocessed sample containing Xe of 5~10% concentration, it is possible to retrieve, after the adsorption and separation processes, a mixed gas with Xe of 50~90% concentration.

At this time, it is desirable to reverse the flow of the sample at the adsorbent by the adsorption and separation processing processes, and set up multiple adsorbent units. By conducting the adsorption process at any one adsorbent unit and at the same time conduct the separation process at the other adsorbent unit, and by switching the units after a certain duration of time, both processes can be performed continuously.

Although, in general, the adsorbent units for the adsorption and separation processes are fixed to the XE retrieval device, by making the units to be removable, it is possible to divide the system into the upstream side and downstream side of the adsorbent units. Therefore, it is possible to move a unit after completion of the adsorption process at the upstream side and then perform the separation process at the downstream side of the system, and then further conduct a high-purification process. These functions increase the versatility of this system, and are especially useful in the aspect of reducing the restrictions in set-up conditions in cases of adding the Xe retrieval device to an existing facility or expanding it. In the following sample processing flow paths the upstream side of the flow of sample is referred to as "upstream" or "upstream side" and the downstream side is referred to as "downstream" or "downstream side."

Although the main function of the adsorption processing process is concentration of Xe, the volume of adsorption of water and $CO_2$ also increases at the same time. By adjusting the heating temperature at the separation process, however, it is possible to purge them and increase selectivity while maintaining the adsorption state of Xe. For example, it will be possible to further separate components that are not separated or have low separation capacity at the adsorption process by removing components with low adsorption temperature through low-temperature heat purge and then apply such processes as high-temperature heat purge.

(A4) Reaction Removal Processing Process of Unsaturated FCs Using a Reactant

This is a processing process that assumes reaction and removal of unsaturated FCs such as $C_2F_4$ and $C_3F_6$ that are a type FCs coexisting in the sample, and takes advantage of the fact calcium compounds react specifically with unsaturated FCs without affecting Xe. As to calcium hydroxide (Ca(OH)$_2$) or compounds with calcium hydroxide as its main component, it is useful for this system since it also provides the effect of removing $CO_2$ in the sample. It is possible to obtain over 99% removal efficiency of unsaturated FCs of several 100 ppm~several 1000 ppm.

Here, calcium compounds mean such compounds as calcium hydroxide (Ca(OH)$_2$), calcium carbonate (CaCO$_3$) and/or tricalcium phosphate (Ca$_3$(PO$_4$)$_2$), or compounds mainly composed of these elements (e.g. soda lime, etc.). Specifically, it is possible to remove $C_2F_4$ by the following reaction formulas 1~3. Similar reactions are obtained using other calcium compounds. It is also desirable to combine these compounds in this system.

$$2Ca(OH)_2 + C_2F_4 \rightarrow 2CaF_2 + 2H_2O + 2CO \qquad \text{(formula 1)}$$

$$2CaCO_3 + C_2F_4 \rightarrow 2CaF_2 + 2CO + 2CO_2 \qquad \text{(formula 2)}$$

$$2Ca_3(PO_4)_2 + 3C_2F_4 + 6H_2O \rightarrow 6CaF_2 + 6CO + 4H_3PO_4 \qquad \text{(formula 3)}$$

The form of calcium compounds to be used here, such as powder or granules, is not stipulated but considering the pressure loss of the processing gas and processing load at downstream, granules or granular compacts made by binding powder are desirable. It is also desirable to make their surface areas large to secure reactivity.

In cases of retrieving further highly-pure Xe, it is desirable to add (A5) low-temperature phase-change separation processing process and (A6) high-temperature getter processing process in addition to the aforementioned processing processes (A1)~(A4). By using these added functions, it is possible retrieve highly-pure Xe of over 99.999% purity.

(A5) Low-Temperature Phase-Change Separation Processing Process

This is a process that uses the normal boiling point of Xe that is −108.1° C., and refine and separate highly pure Xe by low-temperature phase-change separation of the sample from which most of its impurities have been removed. It is possible to separate and remove elements that have lower boiling temperature than Xe, such as nitrogen (N$_2$), oxygen (O$_2$) and argon (Ar) from the sample that contains residual components such as inert gases even though they have low-concentration, by introducing the sample to an open space that is cooled to −110~−150° C. Specifically, it is possible to highly pure Xe of over 99.99% in purity and remove the aforementioned impurities to the level of below 1 ppm. Moreover, in case the sample before processing contains remaining $CF_4$, it is possible to remove it by cooling it to −110~−120° C., which is above its normal boiling point of −128.9° C.

It became possible to efficiently and consistently retrieve Xe by applying the condensation operation of the third stage using the low-temperature phase-change separation after removing majority of the impurities, in addition to the efficient separation and concentration step using the gas separation membrane in the first stage, and the selective adsorption using the adsorbent and concentration by separation from said adsorbent in the second stage.

(A6) High-Temperature Getter Processing Process

This is a process, in addition to the aforementioned 3 stages, using a high-temperature getter that is a means to remove impurities of molecular levels. The process involves re-vaporizing the highly-pure liquefied Xe, remove low-concentration residual components using the high-temperature getter, and further refine and separate Xe with even higher purity. Specifically, it separates and removes high-boiling-point components as $CO_2$ and water that are condensed at the same time Xe is condensed at the low-temperature phase-change separation process, and small amounts of remaining components such as FC, $O_2$, and $N_2$. It makes it possible to secure highly pure Xe of over 99.999% in purity by making the sample go through a metal getter, titanium sponge, for example, that is heated to several 100° C.

At this time, other than titanium sponge, it is possible to use non-evaporable getter materials such as zirconium-vanadium-iron alloy (from such manufacturers as SAES Getters, Nuprure, and Pureron). It is, however, desirable to secure purity of over 99% prior to the process using the high-temperature getter. If a sample with large amount of impurities is processed, not only the function of the getter will be sufficient but also its function may not recover thereafter. In this respect, it is suitable for the refinement process of multiple stages of this system, and is a processing process that is suitable for Xe retrieval systems that require highly pure Xe of over 99.999% in purity such as the semiconductor process.

<Basic Composition (Composition Example 1) of the Xe Retrieval Device Pertaining to this Invention>

FIG. 1 is an outline diagram showing a basic composition (composition example 1) of the Xe retrieval device (hereinafter referred to as "this device") pertaining to this invention. Specifically, it is composed of first adsorption means A1 in which 2 adsorbents are arranged serially, gas separation means A2 comprising gas separation membrane modules, second adsorption means A3 filled with adsorbent, reaction means A4 filled with reactant, third adsorption means A1' in which 2 adsorbents are arranged serially, low-temperature separation means A5, removal means A6 comprising high-temperature getter, and attachments such as the transfer means (pressure booster and vacuum pump) and reservoir tank T.

It is, for example, suitable for application in cases that involve treating waste gases from semiconductor production processes such as plasma etching, after such acidic gases as HF and $F_2$ are removed using such devices as a removal device. Specifically, it is applicable to samples such as those that contain water with saturation at ambient temperature of this device, 0.1~1% $CO_2$, 0.01~0.1% $CHF_3$, $CF_4$, $C_2F_6$, and $C_2F_4$, and 0.1~1% low-concentration Xe. Explanation mainly assuming the following processes of said samples is provided below. It is, however, not restricted to them.

An example of the processing operations of this device with the functions of each component are detailed along the flow of the sample shown in FIG. 1 below. The state of the sample containing Xe after each process operation is equivalent to [Implementation example 1] provided later.

(1) The sample introduced to this system is pressurized to the desired pressure (e.g. 0.1 MpaG) by pressure booster 1, and then introduced to adsorption cylinder 2 (corresponds to first adsorption means). Adsorption cylinder 2 is filled, as mentioned previously, with synthetic zeolite with pore size of 4 Å or smaller in the first-stage 2a and aluminum oxide in the second-stage 2b, and is operated at ambient temperature. Mainly water and $CO_2$ are adsorbed and removed at first-stage 2a and $CHF_3$ is adsorbed and removed at second-stage 2b. Depending on the adsorption capacity of the aluminum oxide, water and $CO_2$ may further be removed at the same time $CHF_3$ is removed.

(2) Then the sample is pressurized again to a desired pressure (e.g. 2 MpaG) by pressure booster 3, and then it is introduced to gas separation membrane module 4 (corresponds to gas separation means A2 and such hollow fiber membrane modules as those made of silicone or polyethylene are preferred). At this time, the pressure of the permeation side of gas separation membrane module 4 is reduced and adjusted to a desired pressure (e.g. −0.1 MpaG) by vacuum pump 5. This separates Xe to the permeation side of the gas separation membrane and saturated FCs such as $CF_4$ and $C_2F_6$ to the non-permeation side of the gas separation membrane to allow efficient concentration of Xe and removal of $CF_4$ and $C_2F_6$. Specifically, it is possible to concentrate Xe 2 to 5 fold, achieve capture ratio of Xe to over 75%, and reduce $CF_4$ and $C_2F_6$ to 5 ppm or lower.

(3) The sample concentrated at gas separation membrane module 4 is pressurized to a desired pressure (e.g. 0.4 MPaG) by pressure booster 6 and then introduced to adsorption cylinder 10 (corresponds to second adsorption means A3). Adsorption cylinder 10 is filled with either activated carbon, synthetic zeolite with pore size of 5 Å or larger, or molecular sieving carbon with pore size of 5 Å or larger to selectively adsorb Xe. The sample that passed through adsorption cylinder 10 is disposed or reused. After the adsorption process is conducted for a designated period of time, adsorption cylinder 10 that adsorbed Xe is heated to 250° C. by electric heater 11 to separate XE adsorbed in the container. At this time, by purging the interior of adsorption cylinder 10 with a small amount of inert gas (e.g. $N_2$, etc.), efficient separation process can be performed. The Xe concentration after purging will be 70~90%. Since the duration of the adsorption process can be approximated by the flow rate of the sample introduced to adsorption cylinder 10, Xe concentration in the sample, and adsorbent capacity, it is possible to preset it. It is also possible to make adsorption cylinder 10 to be a removable unit and divide the device into upstream side U1 and downstream side U2 of adsorption cylinder 10. In case this device, in its entirety, can not be installed immediately near the Xe retrieval facility, the processes of this device in its entirety can be performed by removing adsorption cylinder 10 this device and transfer it to a device, having the means or functions stated below, set up at the downstream side in other places. It only increases the process of transferring it and does not affect its technological and product-related performances. It is also possible to retain the sample containing Xe retrieved and concentrated at adsorption cylinder 10.

(4) The gas containing Xe separated from adsorption cylinder 10 is temporarily filled in reservoir tank T, then pressurized to a desired pressure (e.g. 0.3 MpaG) by pressure booster 21, and then introduced to reaction cylinder 23 (corresponds to reaction means A4). Reaction cylinder 23 is heated to the desired temperature (e.g. over 250° C.) by electric heater 22, and unsaturated FC (specifically, $C_2F_4$) is removed by having it react with $Ca(OH)_2$ and the compound of $Ca(OH)_2$ and NaOH (e.g. soda lime) filled in the cylinder. In case there is $CO_2$ remaining in the sample, it can also be removed at the same time.

(5) The sample discharged from reaction cylinder 23 is further introduced to adsorption cylinder 24 (corresponds to third adsorption means A1'). This adsorption cylinder 24, operated at ambient temperature, is filled with synthetic zeolite with pore size of 4 Å or small in the first-stage 24a and aluminum oxide in the second-stage 24b, and can remove water and $CO_2$ as in (1) stated above. By locating it at the downstream of reaction cylinder 23 of (4) above, it can remove water and $CO_2$ generated by the reaction between calcium compounds and unsaturated FC, and supports high purification of Xe. Moreover, when water and $CO_2$ are contained, it is necessary to remove them beforehand as they condense during the next low-temperature phase-change separation process and clog up the flow path. Hence it also acts as a measure against this problem.

(6) The sample that passed through adsorption cylinder 24 is introduced to cooling separation device 25b via pre-cooling section 25a to perform phase change through liquefaction or solidification (together corresponds to low-temperature separation means A5). Cooling separation device 25b has insulated open-space section 25c inside, which is cooled to the boiling point of Xe or below, to −110~−150° C. by an adequate refrigerant (e.g. such as liquefied nitrogen) for refinement using low-temperature phase-change. Xe in the sample is either liquefied or solidified but the (remaining) sample that contains impurities such as $N_2$, $O_2$, Ar, and $CF_4$ that have lower boiling point than Xe and do not go through phase-change will be disposed as exhaust gas or reused. The level of each impurity component in the liquefied liquid or solidified solid can be lowered to 1 ppm or below.

(7) The liquefied or solidified sample if further re-vaporized through gasification unit 26a for the final process and then passed through titanium sponge 26b (together correspond to removal means A6). Titanium sponge 26b is heated to approximately 650° C. and water, $CO_2$ and extremely small amounts of remaining elements such as FCs, $O_2$, and $N_2$ in the sample can be removed to the order of 0.1 ppm. To efficiently use this titanium sponge, removal of various FCs by processing means (1)~(6) stated above is necessary. With this process it is possible to obtain Xe of over 99.999% purity as final product 27.

In the even the purity of Xe obtained through the aforementioned processing operations pertaining to this device is inferior to what is demanded, it is possible to raise the purity by re-performing the aforementioned processing operations (4)~(6). It is also possible to raise the purity of Xe by re-subjecting the sample retrieved and concentrated at adsorption cylinder 10 in aforementioned processing operation (3) to aforementioned processing operations (4)~(6).

<Composition Example 2 of this Device>

FIG. 2 is an outline diagram that shows another composition (composition example 2) of this device. It shows a set-up with multiple units of processing means A1~A4' (including A1') of the composition example 1, with serially arranged gas separation means A2, and other processing means arranged in parallel. The basic functions are the same as composition example 1, and the differences in composition and functions are detailed below.

As 2 gas separation means A2 are arranged serially, its processing operation and function is different. There is no difference in the objective of concentrating Xe and removing $CF_4$ and $C_2F_6$, and in using silicone or polyethylene hollow fiber membrane module as the gas separation membrane module (Xe is separated at the permeation side of the gas separation membrane and $CF_4$ and $C_2F_6$ are separated at its non-permeation side), and it is designed to improve the separation and concentration efficiency, and retrieval efficiency of Xe by combinations of return flow paths in particular.

Specifically, it is pressurized to a desired pressure (e.g. 0.2 MpaG) by pressure booster 3, and then introduced to the first-stage gas separation membrane module 4. At this time, the permeation side of gas separation membrane module 4 is reduced and adjusted to a desired pressure (e.g. −0.1 MpaG) by vacuum pump 5. The sample at said permeation side is further re-pressurized to a desired pressure (e.g. approximately 0.2 MpaG) by pressure booster 6, and then introduced to the second-stage gas separation membrane module 7. As in the first-stage, the permeation side is adjusted to a desired pressure (e.g. −0.1 MpaG) by vacuum pump 8. At this time, a return flow path connecting the residual side of the second-stage gas separation membrane module 7 and inlet side of the first-stage gas separation membrane module 4 is set up to have the residual gas (non-permeation gas) of second-stage gas separation membrane module 7 merge with the inlet section of first-stage gas separation membrane. Moreover, another return flow path connecting the permeation side of the second-stage gas separation membrane module 7 and its inlet side is set up to have a part of the permeated gas of the second-stage gas separation membrane module 7 merge with the next process, and another part to re-merge with the inlet side of the second-stage gas separation membrane module 7. By doing this, it is possible to achieve both increase in the retrieval rate and increase in the concentration rate of Xe. Specifically, it is possible achieve Xe concentration of 10~20 times, and Xe capture ratio of over 90%. It is also possible to reduce $CF_4$ and $C_2F_6$ to 5 ppm or below. Moreover, by using a third-stage gas separation membrane module, needless to say even higher Xe concentration and further $CF_4$ and $C_2F_6$ reduction can be secured.

As 2 units in each of the processing means A1 (including A1'), A3 and A4, are arranged in parallel, their processing operations are different. It is designed for its continuous long-term use by arranging processing means that actually work on the sample and those that are provided for regeneration and maintenance in parallel. Specifically, as shown in FIG. 3 (A), the solid lines represent the flow paths that actually work on the sample, and the broken lines represent flow paths that are provided for regeneration and maintenance by introduction of purge gas. As shown in FIG. 3 (B), it is possible to switch each flow path after a certain amount of time passes. As to processing means A1 (including A1'), it is possible to regenerate the adsorption capacity by heating the adsorbent at the time of switching from the state of actually working on the sample, and separating the substances adsorbed on it. As to processing means 3, it is possible to introduce the sample containing concentrated Xe to the next processing means by heating the adsorbent at the time of switching from the state of actually working on the sample, and separating the substances adsorbed on it. As to processing means 4, it is possible to conduct maintenance work such as making replacements and inspections of the adsorbent of which the processing capacity has been lowered, at the time of switching from the state of actually working on the sample. It is desirable that these switching operations can be conducted at an individual cycle or desired time for each processing means.

EMBODIMENT EXAMPLE 1

Using the composition example 2 of this device, its performance was verified using $N_2$ balance gas, as test gas, comprising 0.3% concentration Xe, water with saturation at ambient temperature of this device (e.g. 3.1% at 25° C. saturation), 0.3% concentration $CO_2$, and as FCs, $CF_4$ with concentration of 1000 ppm, $CHF_3$ with concentration of 100 ppm, C2F6 with concentration of 200 ppm, and $C_2F_4$ with concentration of 500 ppm, at a flow rate of 25 slm.

The test gas introduced to this device, as shown in FIG. 2, is pressurized to 0.1 MpaG by pressure booster 1, then introduced to adsorption cylinder 2 with synthetic zeolite with pore size of 4 Å as an adsorbent at the first-stage 2a and aluminum oxide at the second-stage 2b, and water and $CO_2$ are removed at first-stage 2a and $CHF_3$ is removed at second-stage 2b. It is then re-pressurized to 0.2 MPaG by pressure booster 3, and then introduced to the first-stage polyethylene hollow fiber membrane module 4, and its permeation side is adjusted to −0.1 MPaG by vacuum pump 5. The gas at the permeation side is re-pressurized to approximately 0.2 MPaG by pressure booster 6, and then introduced to the second-stage polyethylene hollow fiber membrane module 7. As in the first-stage, the permeation side is adjusted to −0.1 MPaG by vacuum pump 8. The residual gas is merged with the inlet section of membrane module 4, one part of permeation gas is merged with the next process, and the rest of the permeation gas is re-merged with the inlet section of second-stage membrane module 7. After the concentrated gas is pressurized to 0.4 MPaG by pressure booster 9, it is introduced to adsorption cylinder 10 where it is adsorbed and stored at ambient temperature. Then adsorption cylinder 10 is heated to 250° C. by electric heater 11 to retrieve the gas containing adsorbed Xe.

At adsorption cylinder 10, not only Xe but also water, $CO_2$ and $C_2F_4$ are concentrated. The gas separated from adsorption cylinder 10 is pressurized to 0.3 MPaG by pressure booster 21, then introduced to reaction cylinder 23 that is filled with soda lime (compound of $Ca(OH)_2$ and OH) and heated to 350° C. by electric heater 22 for the process to remove $C_2F_4$, and $C_2F_4$ is decomposed through reaction and removed. Next, to remove water and $CO_2$, adsorption cylinder 24 that is filled with synthetic zeolite with pore size of 4 Å at the first-stage 24a and aluminum oxide at the second-stage 24b is used again, and water and $CO_2$ are removed at first-stage 24a and a small amount of $CHF_3$ is removed at ambient temperature at second-stage 24b. Then the gas is introduced, via pre-cooling section 25a, to cooling separation device 25b that uses liquefied nitrogen as refrigerant and cooled to −130° C., to remove $Na_2$ and $O_2$ contained in the gas. Next, the liquefied liquid or solidified solid is gasified through gasification unit 26a, and as the final process, introduced to titanium sponge 26b that is heated to 650° C. by an electric heater to remove small amounts of water, $CO_2$, $N_2$, and $O_2$.

Analysis results of each processing operation are shown in table 1 below. As it is evident from table 1, impurities targeted at each processing operation are removed. It also shows that the Xe finally obtained is equivalent to Xe produced through a normal production method by comparison of the two. The Xe recycle rate here is 85% or greater, and is sufficiently usable for practical application.

condition of high-concentration Xe in the sample by concentrating Xe at an early stage, and secure conditions that are advantageous for retrieving highly pure Xe. Moreover, since moving adsorption means A1 downstream does not change the low-load condition, it is possible to make adsorption cylinder 2 (corresponds to first adsorption means A1) compact. Furthermore, as stated later, it becomes possible to simultaneously retrieve large volumes of Xe by connecting multiple gas separation means A2 at multiple sample inlet points.

<Composition Example 4 of this Device>

FIG. 5 shows an outline diagram of composition example 4 of this device. It shows a case in which multiple processing means A1 (including A1') are set up in parallel in composition example 3. It is best suited for application in cases subjecting such samples as those that do not contain water, using a similar composition as composition example 3. The basic functions are the same as composition example 3, and here the differences in composition and functions are provided.

One difference is its processing operation and functions since 2 groups of serially arranged A2a and A2b are arranged in parallel in gas separation means A2. Since it is not necessary to set up first adsorption means A1 with water removal function at upstream, as in aforementioned composition example 3, when the water content in the sample is 0.01% or below, moving it downstream does not change the low-load condition. Therefore, it is possible to set up multiple gas separation means A2a (pressure booster 3a~gas separation membrane module 4a~vacuum pump 5a~pressure booster

TABLE 1

| | \multicolumn{7}{c}{Concentration after each process} |
| | Xe | $H_2O$ | $CO_2$ | $CHF_3$ | $CF_4$ | $C_2F_6$ | $C_2F_4$ |
|---|---|---|---|---|---|---|---|
| Test gas | 0.3% | 3.1% | 0.3% | 100 ppm | 1000 ppm | 200 ppm | 500 ppm |
| (A1) Outlet | 0.3% | <1 ppm | <1 ppm | <0.1 ppm | 1030 ppm | 200 ppm | 510 ppm |
| (A2) Outlet | 7.2% | <1 ppm | 40 ppm | <0.1 ppm | 10 ppm | 2 ppm | 500 ppm |
| (A3) Outlet | 85.2% | 20 ppm | 3500 ppm | <0.1 ppm | 11 ppm | 3 ppm | 3000 ppm |
| (A4) Outlet | Balance | 100 ppm | <1 ppm | <0.1 ppm | 11 ppm | 3 ppm | <0.1 ppm |
| (A5) Outlet | Balance | <1 ppm | <1 ppm | <0.1 ppm | <0.1 ppm | <0.1 ppm | <0.1 ppm |
| (A6) Outlet | Balance | <0.1 ppm | <0.05 ppm | <0.05 ppm | <0.05 ppm | <0.05 ppm | <0.05 ppm |
| Normal method | Balance | <1 ppm | <0.1 ppm | <0.1 ppm | <0.1 ppm | <0.1 ppm | <0.1 ppm |

<Composition Example 3 of this Device>

FIG. 4 shows an outline diagram of composition example 3 of this device. It shows a composition in which processing means A1 and processing means A2 are switched in composition example 1. The basic functions are the same as composition example 1, and here the differences in composition and functions are provided.

It is best suited for application in cases subjecting such samples as those that do not contain water, using a similar composition as composition example 1. That is, since it is not necessary to set up first adsorption means A1 with water removal function at the upstream when water content in the sample is 0.01% or below, it is characterized by the difference from composition example 1 in having gas separation means A2 at the upstream. By doing this, it is possible to conduct processing operations at the downstream while maintaining a 6a~gas separation membrane module 7a~vacuum pump 8a) and multiple gas separation means B2b (pressure booster 3b~gas separation membrane module 4b~vacuum pump 5b~pressure booster 6b~gas separation membrane module 7b~vacuum pump 8b) at multiple sample inlet points to retrieve large volumes of xenon simultaneously.

Another difference, as in aforementioned composition example 2, is its processing operation as two groups of processing means A1 (including A1'), A3 and A4 in composition example 3 are arranged in parallel. It is designed for its continuous long-term use by arranging processing means that actually work on the sample and those that are provided for regeneration and maintenance in parallel. The basic functions are the same as composition example 2, and here details regarding its functions are omitted.

EMBODIMENT EXAMPLE 2

Using the composition example 4 of this device, its performance was verified using $N_2$ balance gas, as test gas, comprising 0.3% concentration Xe, 0.3% concentration $CO_2$, and as FCs, $CF_4$ with concentration of 100 ppm, $CHF_3$ with concentration of 100 ppm, $C_2F_6$ with concentration of 200 ppm, and $C_2F_4$ with concentration of 500 ppm, at a flow rate of 25 slm.

The gas introduced to this device is pressurized to 0.2 MPaG by pressure booster 3, and then introduced to the first-stage silicone hollow fiber membrane module 4, and its permeation side is adjusted to −0.1 MPaG by vacuum pump 5.

The gas at the permeation side is re-pressurized to approximately 0.2 MPaG by pressure booster 6, and then introduced to the second-stage silicone hollow fiber membrane module 7. As in the first-stage, the permeation side is adjusted to −0.1 MPaG by vacuum pump 8. The residual gas is merged with the inlet section of membrane module 4, one part of the permeation gas is merged with the next process, and another part is re-merged with the inlet section of second-stage membrane module 7. The concentrated gas is pressurized to 0.1 MpaG by pressure booster 1, then introduced to adsorption cylinder 2 with synthetic zeolite with pore size of 4 Å as an adsorbent at the first-stage 2a and aluminum oxide at the second-stage 2b, and water and $CO_2$ are removed at first-stage 2a and $CHF_2$ is removed at second-stage 2b. After the concentrated gas is pressurized to 0.4 MPaG by pressure booster 9, it is introduced to adsorption cylinder 10 filled with synthetic zeolite 5A (pore size of 5 Å) as an adsorbent, and adsorbed and stored at ambient temperature. Then adsorption cylinder 10 is heated to 250° C. by electric heater 11 to retrieve the gas containing adsorbed Xe.

At adsorption cylinder 10, not only Xe but also water, $CO_2$ and $C_2F_4$ are concentrated. The gas introduced is pressurized to 0.3 MPaG by pressure booster 21, then introduced to reaction cylinder 23 that is filled with soda lime (compound of $Ca(OH)_2$ and OH) and heated to 350° C. by electric heater 22 for the process to remove $C_2F_4$, and $C_2F_4$ is decomposed through reaction and removed. Next, to remove water and $CO_2$, adsorption cylinder 24 that is filled with synthetic zeolite with pore size of 4 Å at the first-stage 24a and aluminum oxide at the second-stage 24b is used again, and water and $CO_2$ are removed at first-stage 24a and a small amount of $CHF_3$ is removed at ambient temperature at second-stage 24b. Then the gas is introduced, via pre-cooling section 25a, to cooling separation device 25b that uses liquefied nitrogen as refrigerant and cooled to −130° C., to remove $Na_2$ and $O_2$ contained in the gas. Next, the liquefied liquid or solidified solid is gasified, and as the final process, introduced to titanium sponge 26b that is heated to 650° C. by an electric heater to remove small amounts of water, $CO_2$, $C_2$ and $N_2$.

It was confirmed that the purity of product Xe obtained through this device was over 99.999% and is equivalent in performance to Xe produced through the conventional production method. The Xe retrieval rate in this case was 90% or greater, and is sufficiently usable for practical application.

TABLE 2

| | Concentration after each process | | | | | | |
|---|---|---|---|---|---|---|---|
| | Xe | $H_2O$ | $CO_2$ | $CHF_3$ | $CF_4$ | $C_2F_6$ | $C_2F_4$ |
| Test gas | 0.3% | — | 0.3% | 100 ppm | 100 ppm | 200 ppm | 500 ppm |
| (A1) Outlet | 7.5% | <1 ppm | 1.6% | 1600 ppm | 5 ppm | <0.1 ppm | 520 ppm |
| (A2) Outlet | 7.5% | <1 ppm | <1 ppm | <0.1 ppm | 5 ppm | <0.1 ppm | 520 ppm |
| (A3) Outlet | 88.2% | 10 ppm | 40 ppm | <0.1 ppm | 20 ppm | <0.1 ppm | 3500 ppm |
| (A4) Outlet | Balance | <1 ppm | <1 ppm | <0.1 ppm | 20 ppm | <0.1 ppm | <0.1 ppm |
| (A5) Outlet | Balance | <1 ppm | <1 ppm | <0.1 ppm | 20 ppm | <0.1 ppm | <0.1 ppm |
| (A6) Outlet | Balance | <0.1 ppm | <0.05 ppm | <0.05 ppm | <0.05 ppm | <0.05 ppm | <0.05 ppm |
| Normal method | Balance | <1 ppm | <0.1 ppm | <0.1 ppm | <0.1 ppm | <0.1 ppm | <0.1 ppm |

<Composition Example 5 of this Device>

FIG. 6 is an outline diagram that shows composition example 5 of this device. It shows a composition in which processing means A4 in composition example 2 is moved to the upstream side of processing means A1, which makes it to be located at the uppermost-stream. The basic functions are the same as composition example 2, and here the differences in composition and functions are provided.

It is best suited for application in cases subjecting such samples as those that do not contain water, using a similar composition as aforementioned composition examples 3 and 4. That is, since it is not necessary to set up first adsorption means A1 with water removal function at the upstream when water content in the sample is 0.01% or below, it is characterized by having gas separation means A4 at the uppermost-stream so that unsaturated FCs such as $C_2F_4$ and $C_3F_6$ that can not be removed by adsorption or membrane separation are removed as much as possible at the upstream. By doing this, it is possible to improve flexibility of the processing operations for other impurities at the downstream side.

EMBODIMENT EXAMPLE 3

Using the composition example 5 of this device, its performance was verified using $N_2$ balance gas, as test gas, comprising 0.2% concentration Xe, 0.3% concentration $CO_2$, and as FCs, $CF_4$ with concentration of 1000 ppm, $CHF_3$ with concentration of 100 ppm, and $C_2F_4$ with concentration of 500 ppm. It was confirmed that the device is effective even if the processes for removing $C_2F_4$ are inserted in the upstream.

The test gas introduced to this device is then introduced to reaction cylinder 23 that is pressurized to 0.3 MPaG by pressure booster 1, filled with soda lime (compound of Ca(OH)$_2$ and OH), and heated to 350° C. by electric heater 22, and C$_2$F$_4$ is decomposed through reaction and removed. Next, it is introduced, at ambient temperature, to adsorption cylinder 2 that is filled with synthetic zeolite with pore size of 4 Å at the first-stage 2a and aluminum oxide at the second-stage 2b is used again, and water and CO$_2$ are removed at first-stage 2a and a small amount of CHF$_3$ is removed at second-stage 2b. It is then re-pressurized to 0.2 MPaG by pressure booster 3, and then introduced to the first-stage polyethylene hollow fiber membrane module 4, and its permeation side is adjusted to −0.1 MPaG by vacuum pump 5. The gas at the permeation side is re-pressurized to approximately 0.2 MPaG by pressure booster 6, and then introduced to the second-stage polyethylene hollow fiber membrane module 7. As in the first-stage, the permeation side is adjusted to −0.1 MPaG by vacuum pump 8. The non-permeation gas is merged with the inlet section of first-stage gas separation membrane, one part of permeation gas is merged with the next process, and another part is re-merged with the inlet section of second-stage membrane. After the concentrated gas is pressurized to 0.4 MPaG by pressure booster 9, it is introduced to adsorption cylinder 10, filled with activated carbon, where it is adsorbed and stored at ambient temperature. Then adsorption cylinder 10 is heated to 200° C. by electric heater 11 to retrieve the gas containing adsorbed Xe.

At adsorption cylinder 10, not only Xe but also water, CO$_2$ and C$_2$F$_4$ are concentrated. The gas separated from adsorption cylinder 10 is pressurized to 0.3 MPaG by pressure booster 21, then adsorption cylinder 24, as a water and CO$_2$ removal process, that is filled with synthetic zeolite with pore size of 4 Å at the first-stage 24a and aluminum oxide at the second-stage 24b is used again, and water and CO$_2$ are removed at first-stage 24a and a small amount of CHF$_3$ is removed at ambient temperature at second-stage 24b. Then the gas is introduced, via pre-cooling section 25a, to cooling separation device 25b that uses liquefied nitrogen as refrigerant and cooled to −130° C., to remove Na$_2$ and O$_2$ contained in the gas. Next, the liquefied liquid or solidified solid is gasified through gasification unit 26a, and as the final process, introduced to titanium sponge 26b that is heated to 650° C. by an electric heater to remove small amounts of water, CO$_2$, N$_2$, and O$_2$.

It was confirmed that the purity of product Xe obtained through this device was over 99.999% and is equivalent in performance to Xe produced through the conventional production method. The Xe retrieval rate in this case was 80% or greater, and is sufficiently usable for practical application.

As described above, this device makes it possible to provide a simple retrieval method and retrieval device for Xe, with high retrieval efficiency that can functionally remove impurities and retrieve highly pure Xe from such samples that contain low-concentration Xe from, for example, waste gas from semiconductor production processes.

In other words, it is possible to easily retrieve and reuse Xe from gases discharged from semiconductor production processes, and obtain Xe that is equivalent in performance to Xe produced by large-scale air-separation plants. From the embodiment examples, it is possible to retrieve and recycle approximately 80% or more Xe, and hence reduces the cost to purchase the material to approximately 20%. Considering the fact the majority of Xe supply is dependent on overseas sources (non-Japanese), this invention allows obtaining Xe material domestically and consistently even if the consumption of Xe expands in the semiconductor industry.

Although the aforementioned Xe retrieval method and device concerns samples containing low-concentration of Xe, it is by all means possible to process samples containing high-concentration Xe under the same conditions as mentioned above by combining them with dilution processes using inert gas.

INDUSTRIAL APPLICABILITY

In the event of using liquefied gas as a sample, this system can be applied by vaporizing the sample upon introduction to this system.

In the fields other than the semiconductor, it is also possible to easily retrieve and reuse Xe from waste gases containing Xe that are discharged as similar mixed gases. In this manner, this invention contributes to environmental protection through efficient use of resources.

BRIEF EXPLANATION OF FIGURES

FIG. 1 Outline diagram showing basic composition of Xe retrieval device pertaining to this invention.

FIG. 2 Outline diagram showing another composition (composition example 2) of this device.

FIG. 3 Outline diagram showing composition with processing means pertaining to this invention arranged in parallel.

FIG. 4 Outline diagram showing composition example 3 of this device.

TABLE 3

| | Concentration after each process | | | | | | |
|---|---|---|---|---|---|---|---|
| | Xe | H$_2$O | CO$_2$ | CHF$_3$ | CF$_4$ | C$_2$F$_6$ | C$_2$F$_4$ |
| Test gas | 0.2% | — | 0.3% | 100 ppm | 100 ppm | — | 500 ppm |
| (A1) Outlet | 0.2% | <1 ppm | <1 ppm | <0.1 ppm | 120 ppm | <0.1 ppm | <0.1 ppm |
| (A2) Outlet | 6.8% | 10 ppm | <1 ppm | <0.1 ppm | 10 ppm | <0.1 ppm | <0.1 ppm |
| (A3) Outlet | 76.8% | 90 ppm | 15 ppm | <0.1 ppm | 50 ppm | <0.1 ppm | <0.1 ppm |
| (A5) Outlet | Balance | <1 ppm | <1 ppm | <0.1 ppm | 50 ppm | <0.1 ppm | <0.1 ppm |
| (A6) Outlet | Balance | <0.1 ppm | <0.05 ppm | <0.05 ppm | <0.05 ppm | <0.05 ppm | <0.05 ppm |
| Normal method | Balance | <1 ppm | <0.1 ppm | <0.1 ppm | <0.1 ppm | <0.1 ppm | <0.1 ppm |

FIG. 5 Outline diagram showing composition example 4 of this device.

FIG. 6 Outline diagram showing composition example 5 of this device.

EXPLANATION OF CODES 1, 3, 6, 9, 21 pressure booster
2, 24 Adsorption cylinder
2a, 24a First-stage
2b, 24b Second-stage
4, 7 Gas separation membrane module
5, 8 Vacuum pump
10 Adsorption cylinder
11, 22 Electric heater
23 Reaction cylinder
25a Pre-cooling section
25b Cooling separation device
26a Gasification unit
26b Titanium sponge
27 Final product
A1 First adsorption means
A1' Third adsorption means
A2 Gas separation means
A3 Second adsorption means
A4 Reaction means
A5 Low-temperature separation means.
A6 Removal means comprising getter
T Tank
U1 Upstream side of this device
U2 Downstream side of this device It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method to retrieve xenon of purity over 99% from samples that contain approximately 0.1~1 vol % xenon and at least fluorocarbon, characterized by processing operations including at least the following processing steps of said samples:
   (A1) adsorption and removal of trifluoromethane that is a type of said fluorocarbon, using an adsorbent;
   (A2) removal of fluorocarbon having saturated bond that is a type of said fluorocarbon and concentration of xenon using gas separation membranes;
   (A3) adsorption and retrieval of said xenon using an adsorbent and separation of xenon from said adsorbent; and
   (A4) Removal of fluorocarbon having unsaturated bond, that is a type of said fluorocarbon using a reactant.

2. The xenon retrieval method of claim 1 characterized by inclusion of the following processing steps in addition to the aforementioned processing steps (A1) to (A4);
   (A5) processing operation including separation of xenon by a phase-change process under a temperature condition lower than the boiling point of xenon; and
   (A6) separation and removal of residual impurities using a high-temperature getter.

3. The xenon retrieval method of claim 1, characterized by conducting processing operation using synthetic zeolite with pore size of 4 Å or smaller as an adsorbent at the first-stage and aluminum oxide at the second-stage in said processing step (A1).

4. The xenon retrieval method of claim 1, characterized by conducting processing operation using silicone or polyethylene hollow fiber gas separation membrane modules as the gas separation membranes in said processing step (A2).

5. The xenon retrieval method of claim 1, characterized by conducting processing operation using either activated carbon, synthetic zeolite with pore size of 5 Å or larger, molecular sieving carbon with pore size of 5 Å or larger, or a combination of these as an adsorbent in said processing step (A3).

6. The xenon retrieval method of claim 1, characterized by conducting processing operation using calcium compounds as the reactant in said processing step (A4).

7. A device that retrieves xenon of purity over 99% from samples that contain approximately 0.1~1% xenon and at least fluorocarbon, and characterized by having:
   (A1) first adsorption means filled with synthetic zeolite with pore size of 4 Å or smaller and aluminum oxide, arranged serially;
   (A2) gas separation means composed of silicone or polyethylene hollow fiber gas separation membrane modules;
   (A3) second adsorption means filled with either activated carbon, synthetic zeolite with pore size of 5 Å or larger, molecular sieving carbon with pore size of 5 Å or larger, or a combination of these; and
   (A4) and reaction means filled with calcium compounds as reactant.

8. The xenon retrieval device of claim 7 characterized by having the following processing means in addition to aforementioned processing means (A1)~(A4):
   (A5) low-temperature separation means having an open space maintained at temperature lower than the boiling point of xenon;
   (A6) removal means comprising a high-temperature getter.

* * * * *